UNITED STATES PATENT OFFICE.

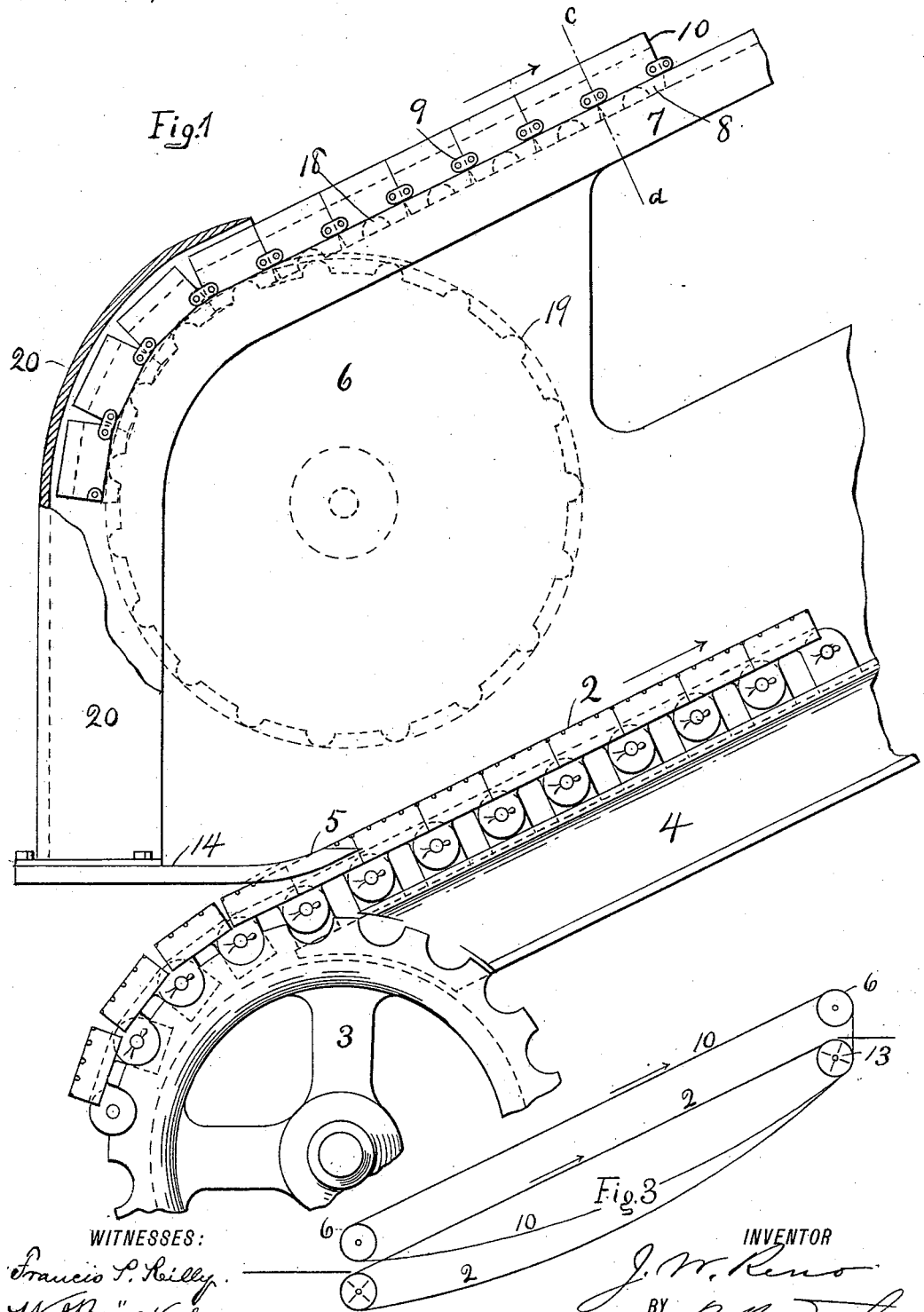

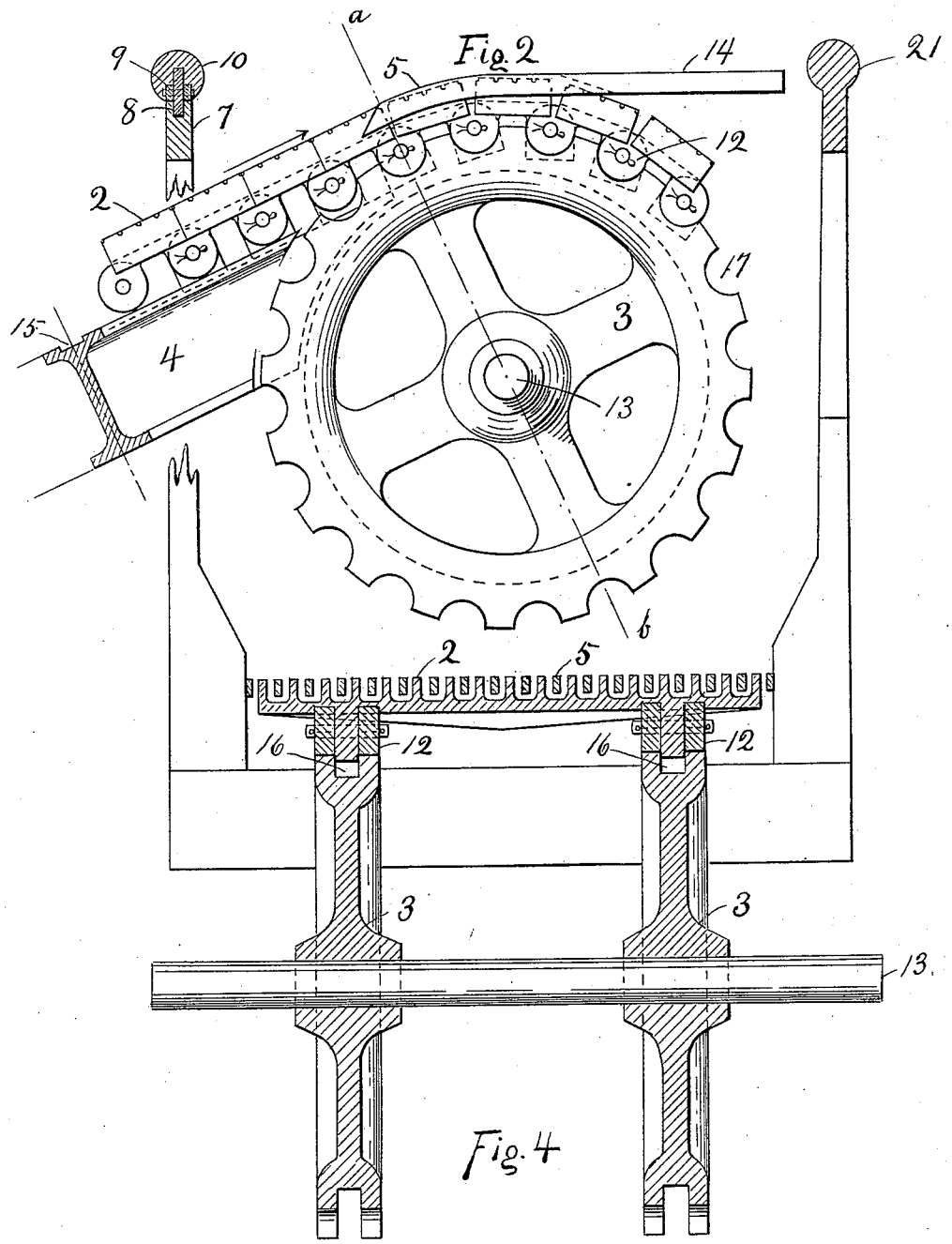

JESSE W. RENO, OF NEW YORK, N. Y.

ENDLESS CONVEYER OR ELEVATOR.

SPECIFICATION forming part of Letters Patent No. 470,918, dated March 15, 1892.

Application filed January 2, 1891. Serial No. 376,455. (No model.)

*To all whom it may concern:*

Be it known that I, JESSE W. RENO, of the city of New York, in the county and State of New York, have invented a new and useful Endless Conveyer or Elevator, which invention is fully set forth and illustrated in the following specification and accompanying drawings.

The object of this invention is in particular to provide a mechanical incline or slide-conveyer to be used in place of elevators or stairways where large numbers of persons are to be transferred from one floor or level to another, either upward or downward.

The invention will first be described in detail, and then particularly set forth in the claims.

In the accompanying drawings, Figure 1 shows a side elevation of part of the conveyer and hand-rail at a suitable angle or inclination at its lower end. Fig. 2 shows a side elevation of the upper end of the conveyer or "slide." Fig. 3 shows a diagram of the device in general outline. Fig. 4 shows a cross-section through the line *a b* of Fig. 2.

In said figures the several parts are respectively indicated by reference-numbers as follows:

The conveyer or elevator proper consists of a continuous or endless belt formed of sections, preferably of cast-iron, as shown at 2, Figs. 2 and 4. These sections are hinged together, as shown at 12, and are cast with a grooved surface, as shown in cross-section in Fig. 4. Into the grooves of said surface, which may be made about three-fourths of an inch wide by one inch deep, the prongs 5 of the comb-like landings 14 extend. These landings, preferably made of cast-steel, are rigidly fixed, so that their prongs 5 have a clearance of, preferably, say, not exceeding one-eighth of an inch between the bottoms and sides of the grooves in the sections 2 of the endless belt. Said belt made up of said sections is turned upon the two pairs of sprocket-wheels 3, all of similar design, the notches 17 about their circumferences forming seats into which the rounded parts of the hinges 12 rest. Power for moving the belt is preferably applied to the wheels 3 at the top of the conveyer; but power may be applied at the bottom of the conveyer, if desired, the return of the belt being supported on guides or tracks from the top to the bottom. Between the pairs of wheels 3 at the top and bottom of the conveyer the moving belt is supported and slides upon two I-beams 4, the squared hinged parts of each section of the belt fitting into a planed channel 15 in each of said beams, which channels prevent lateral motion of the belt. Planed channels like 15 of the I-beams 4 are continued as grooves 16 in the wheels 3, as shown in Figs. 1 and 2, so that as the square parts of the hinges 12 leave the sliding or planed surfaces 15 of the beams 4 the rounded parts of the hinges are engaged by and supported in the seats or notches 17 about the circumferences of the wheels 3.

As it will add to the feeling of security and comfort of the passengers to grasp a hand-rail as they ascend or descend upon the conveyer a moving hand-rail 10 is provided, as shown in the drawings. A conveyer would be complete for a single file of passengers with but one moving hand-rail, but for a conveyer on which two passengers can stand abreast a moving rail on each side of the same would be preferably provided.

In Fig. 4 the moving hand-rail is shown at 10 and a fixed hand-rail on the opposite side at 21; but a plain wall or guard of any kind may of course take the place of the rail 21.

Referring to Fig. 1, it will be observed that the moving hand-rail is made in short joints or sections 10, which construction permits said rail to bend around the sprocket-wheels 6. Said sprocket-wheels are preferably made of the same radius as the gear-wheels 3. Motion may be imparted to the sectional railing 10 by passing the same around a sprocket-wheel similar to wheel 6, suitably secured on shaft 13, Figs. 3 and 4.

In Fig. 4, at 7 8 10, is shown a section through the jointed moving hand-rail 10 and the fixed railing 7, on which said hand-rail slides, the steel plates 8, secured to each individual rail-piece 10, sliding in a groove in the rail 7, as clearly illustrated in said figure. Said plates 8 are preferably cemented in slots in the rail-pieces 10 and are held to each other by the steel links 9, Fig. 1. The lower parts of said plates 8 are provided with notches 18, so that as the rail-sections 10 travel said notches fit and mesh into the teeth 19 on the circumferences of the wheels 6. The faces of these wheels 6 are channeled similarly to the channels in the rail 7, so as to hold the plates 8 securely in position when passing around them. The rail-pieces 10 are preferably turned from hard wood, alternately light and dark in color, so as to attract the attention of passengers. Of course the same result as that effected by the continous channels and notched ridges upon the belt's upper surface can be obtained by substituting rows of pegs, which would also pass between the spaces in the comb-like landings. Steel balls or small rollers may also be substituted for the sliding contact between the belt-sections 10 and the I-beams 4. The belt, however, being perfectly balanced, much friction is thereby obviated and the friction-surfaces along the channeled I-beams and in the notches or teeth in the sprocket-wheels 3 are thoroughly protected from falling grit or dirt. At the upper and lower landings the sprocket-wheels 6 of the moving railing are inclosed in casings, which extend over segments of the moving rail, as shown at 20 in Fig. 1. It can now be seen that by this invention is provided a continuously-moving endless inclined conveyer or elevator and hand-rail. The passenger who steps upon said conveyer will be carried by it either up or down, as the case may be, without effort on his part, and as the apparatus is automatic an accident in ascending or descending will be impossible. The conveyer and its hand-rail will each preferably move at the rate of an average walk—about two hundred feet per minute—thus giving a maximum capacity of six thousand passengers per hour in single file. A person stepping upon the conveyer will experience no change in his motion and on arriving at the top or bottom will be transferred to the comb-shaped landing without any special attention on his part.

It is purposed to have the conveyer set at an angle of slope of about twenty-five degrees, and when provided with a notched or roughened upper surface the conveyer can be stood upon by passengers with ease, especially when grasping the traveling hand-rail, which will be moving at the same rate as that of the conveyer.

Where more than one of these conveyers are used, instead of reversing the direction of the conveyer, one or one set of conveyers, with their hand-rails, may be run to elevate from one floor-level to another, and one or one set of elevators, with their hand-rails, may be run to descend and convey passengers from one floor-level to a lower level, so that there will be no stopping of the conveyers and no change of direction in their movements, and crowds or streams of persons may pass each other in opposite directions without confusion or detention.

Having thus fully described my said invention, I claim—

1. A traveling conveyer adapted for the conveyance of passengers, composed of short links or sections hinged together in the form of an endless belt, said sections being channeled longitudinally, as described, in combination with a landing or landings channeled or combed to register with the channeled surfaces of said sections, whereby transfer from conveyer to landing, or vice versa, is effected, substantially as set forth.

2. In combination with a conveyer or elevator, a traveling hand-rail composed of short links or sections hinged together in the form of an endless chain, and a stationary support or supports and sprocket-wheels therefor, substantially as set forth.

3. The combination, with a combed landing or landings, of an endless hinged traveling platform and an endless traveling hand-rail therefor, said elements being constructed and operating substantially as and for the purposes set forth.

JESSE W. RENO.

Witnesses:
FRANCIS P. REILLY,
THEO. H. FRIEND.